United States Patent [19]
Ji et al.

[11] Patent Number: 5,272,554
[45] Date of Patent: Dec. 21, 1993

[54] LIQUID CRYSTAL LIGHT VALVE HAVING A $SIO_2/TIO_2$ DIELECTRIC MIRROR AND A $SI/SIO_2$ LIGHT BLOCKING LAYER

[75] Inventors: Il-hwan Ji, Kyunggi; Seok-bum Ma, Seoul, both of Rep. of Korea

[73] Assignee: SamSung Electronics Co. Ltd., Suwon, Rep. of Korea

[21] Appl. No.: 824,220

[22] Filed: Jan. 22, 1992

[30] Foreign Application Priority Data

Jan. 28, 1991 [KR] Rep. of Korea ............... 91-1413
Jan. 29, 1991 [KR] Rep. of Korea ............... 91-1509

[51] Int. Cl.$^5$ .................... G02F 1/1335; G02F 1/135
[52] U.S. Cl. ........................... 359/67; 359/71; 359/72
[58] Field of Search ................. 359/67, 71, 72

[56] References Cited

U.S. PATENT DOCUMENTS

| | | | |
|---|---|---|---|
| 3,832,034 | 8/1974 | Edmonds | 359/59 |
| 4,763,985 | 8/1988 | Bingham | 359/518 |
| 4,799,773 | 1/1989 | Sterling | 359/72 X |
| 4,826,300 | 5/1989 | Efron et al. | 359/72 |
| 4,881,110 | 11/1989 | Braatz et al. | 357/30 |
| 4,913,531 | 4/1990 | Efron et al. | 359/72 |
| 4,925,276 | 5/1990 | McMurray, Jr. et al. | 359/72 |
| 4,941,735 | 7/1990 | Moddel et al. | 359/67 X |
| 5,056,895 | 10/1991 | Kahn | 359/71 X |
| 5,084,777 | 1/1992 | Slobodin | 359/72 |
| 5,132,814 | 7/1992 | Ohkouchi et al. | 359/72 |

FOREIGN PATENT DOCUMENTS 58-215626 12/1983 Japan .............. 359/72
62-40430 2/1987 Japan .

*Primary Examiner*—William L. Sikes
*Assistant Examiner*—Ron Trice
*Attorney, Agent, or Firm*—Robert E. Bushnell

[57] ABSTRACT

A liquid crystal light valve (LCLV) adapted to a large scale image projecting apparatus or an optical data processing apparatus is disclosed wherein the sectional structure is improved. The LCLV comprises a substrate, an amorphous silicon photoconductor layer formed on the substrate, a light absorbing layer and a dielectric reflection layer formed on the photoconductor layer, wherein the light absorbing layer is made up of a $Si/SiO_2$ multilayer and the dielectric reflection layer is made up of $TiO_2/SiO_2$. Here, the $Si/SiO_2$ and $TiO_2/SiO$ multilayers are integrally combined, so that the $TiO_2/SiO_2$ multilayer is used as a dielectric mirror and the $Si/SiO_2$ multilayer is used as a dielectric mirror and a light absorbing layer. A p-type amorphous silicon layer together with boron and hydrogen can be used as the light absorbing layer and a $TiO_2/SiO_2$ multilayer may be used as a dielectric mirror. Accordingly, without a special bonding structure, the LCLV obtains an improved display state and a fast response speed, and facilitates a manufacturing process.

24 Claims, 2 Drawing Sheets

LIQUID CRYSTAL LIGHT VALVE HAVING A SIO₂/TIO₂ DIELECTRIC MIRROR AND A SI/SIO₂ LIGHT BLOCKING LAYER

BACKGROUND OF THE INVENTION

This invention relates to a liquid crystal light valve (LCLV) adapted to a large-scale image projector or an optical data processing apparatus, and more particularly an improved liquid crystal light valve capable of employing a titanium dioxide/silicon dioxide mirror without a bonding structure which enables the use of such a mirror.

There are, in general, two types of the liquid crystal light valve, one of which is a reflective type and the other of which is a transmissive type. Conventional LCLV utilizes electro-optical characteristics of the liquid crystal of which the dynamic property varies according to the quantity of the scanned input light, and modulates a projected output light. The LCLV is applied to amplify a light constituting an image or to vary a light wavelength. Such a LCLV is used in a light reflective and transmissive projecting system or an optical document processing apparatus.

In particular, the LCLV is employed in the design of infrared detectors for tracking missiles. Simulation of complex infrared radiation patterns from missiles has been performed. In the simulation, a LCLV for creating high resolution dynamic infrared images of a controlled or predetermined infrared radiation pattern and pattern history is employed. The LCLV of such an object is disclosed in U.S. Pat. No. 4,114,991 to Bleha, Jr. et al. The conventional reflective LCLV requires a very thick reflective film for operation in the 8-14 micron infrared region. Accordingly, in the above-mentioned U.S. Pat. No. 4,114,991, the incium-tin oxide reflective film is used to obtain a film of less than 0.3 microns thick. However, since a cadmium sulfide (CdS) photoconductor layer and a cadmium telluride (CdTe) light absorbing layer are used in the above U.S. Pat. No. 4,114,991, a response speed is slow and a manufacturing process is considerably more difficult.

Also, in order to operate the LCLV, the switching of a control voltage which dynamically controls a liquid crystal capable of double-refracting the output light by means of a photoconductor layer which is ionized by the input light having an image signal, should be followed. Thus, if there is no light, the impedance between the photoconductor layer and the reflective film should be maintained much greater than that of the liquid crystal. On the other hand, if there is light, the impedance should become much smaller than that of the liquid crystal. In such a LCLV, the impedance of the photoconductor layer should match with that of the liquid crystal because of the required operational property. A typical structure of the above-mentioned LCLV is disclosed in the U.S. Pat. No. 3,824,002 to Beard. The basic structure is the same as that shown in FIG. 1.

In FIG. 1, transparent electrodes 13 and 13a to which the AC driving voltage supplied from AC voltage source 10 is applied, are attached to the respective inner sides of two parallel transparent substrates 12 and 12a. Liquid crystal 19 located between transparent substrates 12 and 12a which maintain a specified distance by means of spacers 18 and 18a has two alignment films 17 and 17a attached to both sides thereof. The layers such as a photoconductor layer 14, a light absorbing layer 15 and a reflective film 16 are sandwitched between transparent electrode 13 formed on transparent substrate 12 where input light 1100 is incident, and an alignment film 17 is opposed to the transparent electrode 13. Unexplained reference numeral 11 in the drawing designates a coated layer which prevents input light from being reflected.

Also, in FIG. 1 the transparent substrate 12a facing toward output light 1200 receives infrared rays of light projected from the external source (not shown) and transmits the received infrared rays through the transparent electrode 13a, the liquid crystal 19 to reflective film 16. At this time, the projection light which is transmitted through the liquid crystal 19 is reflected by the reflective film 16 and returned back. The projection light 1200 of the infrared region is tuned to the variation of the polarized state which is induced according to the alignment variation of the liquid crystal molecules corresponding to the voltage variation across the liquid crystal due to the variation of the impedance which is induced by the photoconductor layer 14 according to the image of the visible input light 1100 incident in the opposite side.

In the above-mentioned LCLV, the photoconductor layer 14 is made of cadmium sulfide CdS, and the light absorbing layer 15 is made of cadmium telluride CdTe having an excellent matching characteristic with respect to the photoconductor layer 14. The LCLV having such a structure uses cadmium sulfide CdS having a low photosensitivity and a low response characteristic as a material of the photoconductor layer. For this reason, it is very difficult to create a dynamic image having high resolution and high frequency density.

To solve the above defect, a LCLV technology is disclosed in the U.S. Pat. No. 4,799,773. The LCLV disclosed in the U.S. Pat. No. 4,799,773 comprises an amorphous silicon (a-Si) photoconductor layer 24 and a cadmium telluride CdTe light absorbing layer 25, as shown in FIG. 2. In addition, this LCLV features an intermediate bonding layer 210 for properly contacting the above photoconductor layer 24 and the above light absorbing layer 25 to each other, that is, for compensating the different bonding properties between them.

Bonding layer 210 comprises four layers as shown in FIG. 3, that is, a first silicon dioxide (SiO₂) layer 210a, a second oxygen-rich SiO₂ layer 210b, a first oxygen-rich CdTe layer 210c and a second CdTe layer 210d.

However, since CdTe does not have a good mechanical bonding property with respect to the amorphous silicon (a-Si) the above LCLV must comprise a particular bonding layer 210. For this reason, a distinct manufacturing process is required, thereby raising the manufacturing cost.

As material of the light absorbing layer 25 in order to solve the above defects, a-SiGe, a-Si:F:H and so on are known. These materials however have defects in that the product is polluted and the film is damaged due to the elements of Ge, F etc. In fact, it is difficult to control due to the physical condition required as a light absorbing layer.

SUMMARY OF THE INVENTION

It is, therefore, an object of this invention to provide a liquid crystal light valve which comprises an amorphous silicon photoconductor layer, and a dielectric mirror which functions as a reflective film composed of a silicon and silicon dioxide (Si/SiO₂) multilayer and a titanium dioxide and silicon dioxide (TiO₂) multilayer, thereby obtaining an improved display state and a fast response, and facilitating a manufacturing process, without a special bonding means.

It is another object of the present invention to provide a liquid crystal light value which comprises an amorphous silicon photoconductor layer and a p-type amorphous silicon light absorbing layer with boron, thereby improving a response speed.

It is still another object of the present invention to provide a liquid crystal light valve for converting a visible wavelength image to an infrared wavelength image.

To accomplish the above objects, there is provided, according to one aspect of the invention, a liquid crystal light valve structure, comprising:

a substrate;

an amorphous silicon photoconductor layer formed on the substrate;

a light absorbing layer formed on the photoconductor layer; and a dielectric mirror layer formed integrally with and on the light absorbing layer;

wherein the light absorbing layer is composed of alternating layers of silicon and silicon dioxide, and wherein the dielectric mirror layer is composed of alternating layers of titanium dioxide and silicon dioxide.

According to first aspect of the present invention, the $Si/SiO_2$ multilayer and the $TiO_2/SiO_2$ multilayer are adhered to each other to be integrally formed, with a result that the $TiO_2/Si_2$ multilayer functions as a dielectric mirror and the $Si/SiO_2$ multilayer functions as a dielectric mirror and a light absorbing layer.

According to another aspect of this invention there is provided a liquid crystal light valve, comprising:

a first transparent substrate which is made up of a visible light transmissive material, and of which the one side is to receive the visible wavelength image;

a second transparent substrate which is arranged in the opposing side of said first transparent substrate, and of which the one side is composed of a material capable of transmitting an infrared light;

a first conductive electrode which is adhered to the other side of said first transparent substrate and which transmits a visible light region or reflects an infrared light region;

a second conductive electrode which is adhered to the other side of said second transparent substrate and which transmits the infrared light region and visible light region;

a voltage source of which both ends are connected to said first and second conductive electrodes, respectively;

a liquid crystal layer which is arranged between said first and second conductive electrodes, and of which both sides are adhered to alignment films; and light sensor means including a photoconductor layer composed of an amorphous silicon which is adherent to the one side of said first conductive electrode, a light absorbing layer and a dielectric mirror layer which are, in turn, arranged between said photoconductive layer and the alignment film toward the visible light of said liquid crystal layer, wherein said dielectric mirror layer comprises alternating layers of titanium dioxide and silicon dioxide, thereby converting a visible light to an infrared light.

DETAILED DESCRIPTION OF THE INVENTION

The liquid crystal light valves of the preferred embodiments according to this invention will be described below in detail with reference to the accompanying drawings.

Figure 1:
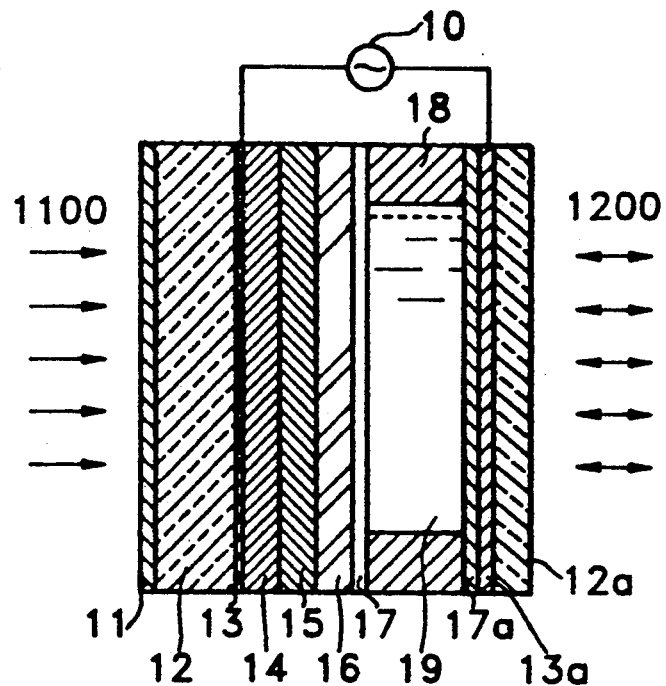
FIG. 1 illustrates a side sectional view of the conventional liquid crystal light valve.
Figure 2:
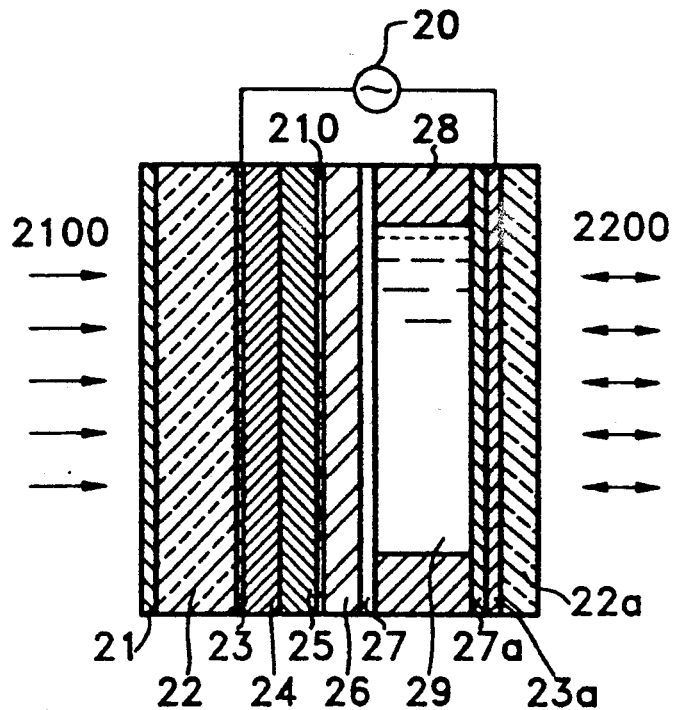
FIG. 2 illustrates a side sectional view of another conventional liquid crystal light valve.
Figure 3:
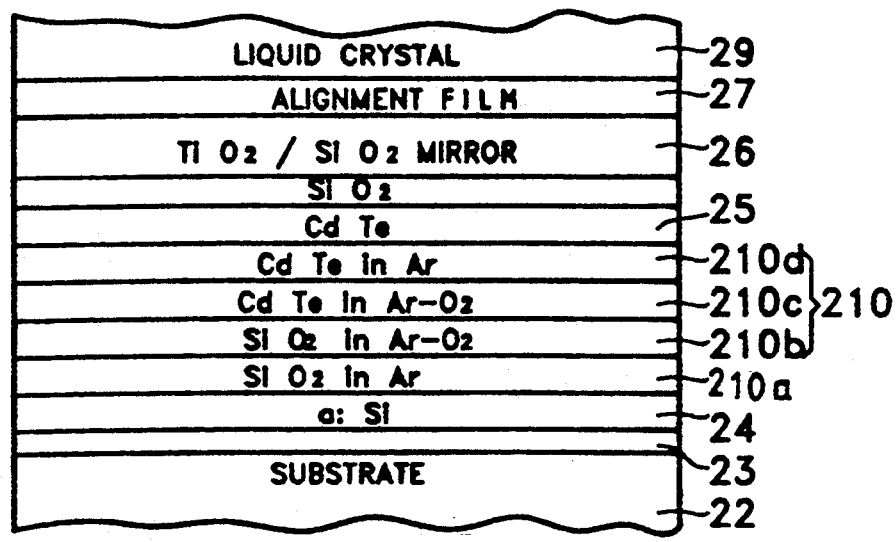
FIG. 3 is a sectional view showing the combined structure of the parts of the respective layers of the liquid crystal light valve shown in FIG. 2.
Figure 4:
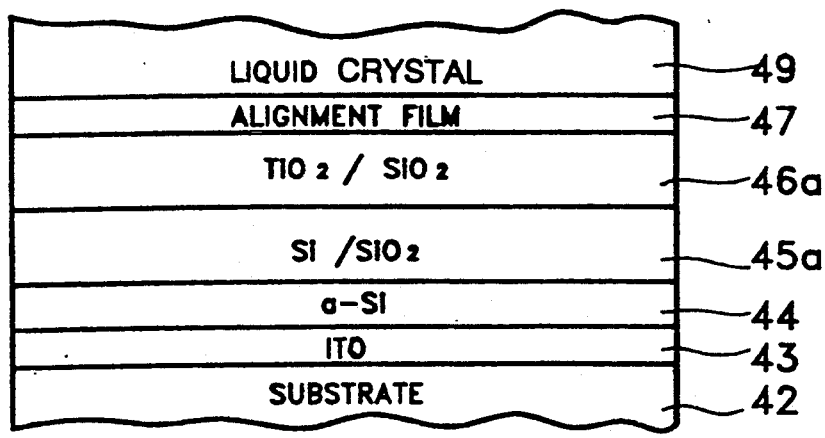
FIG. 4 is a sectional view showing the combined structure of the parts of the respective layers of the liquid crystal light valve according to the present invention.

FIG. 4 schematically shows the structure of the liquid crystal light valve according to the present invention.

As shown in FIG. 4, according to the structure of the liquid crystal light valve of the present invention, an indium tin oxide (ITO) layer 43 is formed on the substrate 42. The above ITO layer forming process is performed to adhere the amorphous silicon layer 44 to the substrate 42. Then, a $Si/SiO_2$ multilayer and a $TiO_2/SiO_2$ multilayer are and formed on the amorphous silicon layer 44.

The above process will be described below in more detail.

The transparent substrate 42 is coated with an ITO layer 43 which enables an i-type amorphous silicon photoconductor layer 44 to adhere on the transparent substrate 42 by means of a glow discharge decomposition. At this time, the transparent substrate 42 is heated up to about 250° C. by a plasma chemical vapor deposition procedure. Thereafter, a silicon gas is mixed with 10 to 20 ppm diboran gas and hydrogen gas. On the photoconductor layer 44, a $Si/SiO_2$ dielectric multilayer thin film 45a is formed by alternately laminating a Si thin film and a $SiO_2$ thin film under the atmosphere of a mixture of argon and oxygen, using Si target in the sputtering system. The alternating layers of silicon and silicon dioxide are laminated to result in 10 to 20 layers. Next, a dielectric mirror 46a is fabricated by alternately laminating a $TiO_2$ thin film and a $SiO_2$ thin film in an oxygen atmosphere using Ti and Si targets in the same reaction chamber. The alternating layers of titanium dioxide and silicon dioxide are laminated to result in 12 to 24 layers. Then, a liquid crystal alignment film 47 is formed on the dielectric mirror 46a. At the same time, after another liquid crystal alignment film is formed toward the opposed transparent substrate, both the alignment films are sealed. Subsequently, the liquid crystal 49 is injected between both the alignment films to complete the desired LCLV.

According to another embodiment of this invention, the above light absorbing layer 45a may be composed of a p-type amorphous silicon added with boron and hydrogen instead of the $Si/SiO_2$ dielectric multilayer thin film.

The operational principle of the LCLV according to the present invention is as follows.

In the general LCLV, if there is no input visible wavelength signal, the impedance between the photoconductor layer and the dielectric mirror layer becomes greater than that of the liquid crystal layer. Thus, since the voltage applied to the liquid crystal maintains at an equilibrium state in a lower state than the liquid crystal driving voltage, the infrared wavelength light of the output side is absorbed in the arrangement of the liquid crystal. Thus, there is no change in the output light.

On the other hand, if the input light is incident to the photoconductor layer through the transparent substrate, the impedance of the photoconductor layer is decreased. At the same time, the voltage applied to the liquid crystal is higher than the liquid crystal driving voltage. Accordingly, the liquid crystal is driven by the applied voltage. Thus, the output light is transmitted the liquid crystal by way of the driven liquid crystal arrangement, so that the light is reflected again from the dielectric mirror and returned out. At this time, the output light which is not reflected in the dielectric mirror arrives at the light absorbing layer, and is absorbed therein. As described above, since the output light is modulated according to the input light signal using the impedance matching of the photoconductor layer, the dielectric mirror layer and the liquid crystal layer, the liquid crystal light valve can operate efficiently.

Hereinafter, an operational principle of the $Si/SiO_2$ dielectric thin film and the $TiO_2/SiO_2$ dielectric mirror layer will be described below.

The $TiO_2/SiO_2$ multilayer thin film is a typical structure for the original dielectric mirror, and is designed and fabricated according to the wavelength region of the utilized output light. The $Si/SiO_2$ multilayer thin film is used as a dielectric mirror due to the large difference of the refractive indexes between two thin films. However, since the band gap of the Si thin film is approximately 1.7 election volt, and the absorption coefficient thereof is large in the visible wavelength region, the $Si/SiO_2$ multilayer thin film reflects the light, at the same time absorbs a considerable amount of the light. In this embodiment using the above features, the $Si/SiO_2$ multilayer and $TiO_2/SiO_2$ multilayer are combined, thereby supplementing the reflection characteristic of the $TiO_2/SiO_2$ dielectric mirror and simultaneously playing a role as a light absorbing layer which absorbs unreflected output light by a Si thin film.

As described above, according to the first embodiment, the following effects can be obtained by combining the $Si/SiO_2$ multilayer with the $TiO_2/SiO_2$ multilayer for use in the dielectric mirror.

1. By combining the $Si/SiO_2$ multilayer with the $TiO_2/SiO_2$ dielectric mirror, the reflection efficiency is heightened and the scope of designing the dielectric mirror is broadened, in comparison with the use of the only $TiO_2/SiO_2$ dielectric mirror.

2. Without designing and fabricating a separate light absorbing layer, the $Si/SiO_2$ multilayer can play a role as a light absorbing layer. That is, the $Si/SiO_2$ dielectric thin film can be utilized as a light absorbing layer.

3. Without a special bonding means as disclosed in the U.S. Pat. No. 4,799,773, the LCLV can be fabricated.

4. By fabricating the light absorbing layer and the dielectric mirror in the same reaction chamber of the sputtering system, the pollution between the layers can be prevented. In addition, the bonding capability between the layers can be increased by using same kind of material.

According to the second embodiment of the present invention, a p-type amorphous silicon added with boron and hydrogen can be used as a light absorbing layer instead of the $Si/SiO_2$ dielectric multilayer thin film, thereby facilitating the manufacturing process, and increasing the response speed.

What is claimed is:

1. A liquid crystal light valve structure, comprising:
   a substrate;
   a photoconductor layer formed on the substrate;
   a light absorbing layer formed on the photoconductor layer; and
   a dielectric mirror layer on the light absorbing layer;
   wherein the light absorbing layer is composed of alternating layers of silicon and silicon dioxide, and the dielectric mirror layer is composed of alternating layers of titanium dioxide and silicon dioxide.

2. The liquid crystal light valve structure as claimed in claim 1, wherein said alternating layers of silicon and silicon dioxide are laminated to result in 10 to 20 layers in the light absorbing layer.

3. The liquid crystal light valve structure as claimed in claim 1, wherein said alternating layers of titanium dioxide and silicon dioxide are laminated to result in 12 to 24 layers in the dielectric mirror layer.

4. A liquid crystal light valve as claimed in claim 1, wherein said photoconductor layer is comprised of amorphous silicon and hydrogen.

5. A liquid crystal light valve, comprising:
   a first transparent substrate of a visible light transmissive material having one side disposed to receive a visible light representing an image;
   a second transparent substrate of an infrared light transmissive material arranged in parallel of said first transparent substrate;
   a first conductive electrode adhered to the other side of said first transparent substrate, for transmitting the visible light received by the first transparent substrate and reflecting an infrared light;
   a second conductive electrode adhered to the other side of said second transparent substrate, for transmitting the infrared light and the visible light;
   a voltage source connected to said first and second conductive electrodes;
   a liquid crystal layer disposed between said first and second conductive electrodes having each side adhered to an alignment film; and
   light sensor means disposed between said liquid crystal and said first conductive electrode, said light sensor means comprising a photoconductor layer, a light absorbing layer and a dielectric mirror layer successively disposed toward the visible light of said liquid crystal layer,
   wherein said dielectric mirror layer comprises alternating layers of titanium dioxide and silicon dioxide and said light absorbing layer comprises alternating layers of silicon and silicon dioxide.

6. A liquid crystal light valve as claimed in claim 5, wherein said photoconductor layer is comprised of amorphous silicon and hydrogen.

7. A liquid crystal light valve, comprising:
   first and second transparent substrates arranged in parallel and space-apart by a given distance;
   a first electrode disposed upon said first transparent substrate toward said second transparent substrate, said first electrode being positioned in between said first and second transparent substrates;
   a second electrode disposed upon said second transparent substrate toward said first transparent-substrate, said second electrode being positioned in between said first and second transparent substrates;

a photoconductor layer positioned upon said first electrode, for exhibiting an impedance varying upon impinging light incident upon said first transparent substrate, said impinging light representing an image signal;

a light absorbing layer formed on said photoconductor layer, said light absorbing layer comprising layers of silicon and silicon oxide;

a dielectric mirror layer formed on said light absorbing layer, said dielectric mirror layer comprising layers of silicon oxide and titanium oxide;

a liquid crystal layer insulated from, and disposed between said dielectric mirror layer and said second electrode, for enabling double-refraction of the impinging light; and a voltage source for providing a voltage potential across the first and second electrodes.

8. A liquid crystal light valve as claimed in claim 7, wherein said photoconductor layer is comprised of amorphous silicon and hydrogen.

9. A liquid crystal light valve as claimed in claim 7, wherein said light absorbing layer is comprised of 10 to 20 laminations of alternate layers of silicon and silicon oxide.

10. A liquid crystal light valve as claimed in claim 7, wherein said dielectric mirror layer is comprised of 12 to 24 laminations of alternate layers of silicon oxide and titanium oxide.

11. A liquid crystal light valve as set forth in claim 7, further comprised of said light absorbing layer comprising a plurality of laminations of alternate layers of silicon and silicon oxide.

12. A liquid crystal light valve as set forth in claim 7, further comprised of said dielectric mirror layer comprised of a plurality of laminations of alternate layers of silicon oxide and titanium oxide.

13. A liquid crystal light valve, comprising:
a transparent substrate;
a photoconductor layer formed on the substrate and exhibiting an impedance varying upon impinging light representing an image signal;
a light absorbing layer formed on the photoconductor layer, said light absorbing layer comprising layers of silicon and silicon oxide; and
a dielectric mirror layer formed on the light absorbing layer, said dielectric mirror layer comprising layers of silicon oxide and titanium oxide.

14. A liquid crystal light valve as claimed in claim 13, wherein said photoconductive layer is comprised of one of a first combination of amorphous silicon and hydrogen and a second combination of p-type amorphous silicon, boron and hydrogen.

15. A liquid crystal light valve as claimed in claim 13, wherein said light absorbing layer is comprised of 10 to 20 laminations of alternate layers of silicon and silicon oxide.

16. A liquid crystal light valve as claimed in claim 13, wherein said dielectric mirror layer is comprised of 12 to 24 laminations of alternate layers of silicon oxide and titanium oxide.

17. A liquid crystal light valve as set forth in claim 13, further comprised of said light absorbing layers comprising a plurality of laminations of alternate layers of silicon and silicon oxide.

18. A light crystal valve as set forth in claim 13, further comprised of said dielectric mirror layer comprising a plurality of laminations of alternate layers of silicon oxide and titanium oxide.

19. A method for fabricating a liquid crystal light valve, comprising the steps of:
arranging first and second transparent substrates in parallel and spaced-apart by a given distance;
disposing a first electrode layer on said first transparent substrate toward said second transparent substrate, said first electrode being positioned in between said first and second transparent substrates;
disposing a second electrode on said second transparent substrate toward said first transparent substrate, said second electrode being positioned in between said first and second transparent substrates;
positioning a photoconductive layer on said first electrode for exhibiting an impedance varying upon impinging light incident upon said first transparent substrate, said impinging light representing an image signal;
forming a light absorbing layer on said photoconductive layer, said light absorbing layer comprising layers of silicon and silicon oxide;
forming a dielectric mirror layer on said light absorbing layer, said dielectric mirror layer comprising layers of silicon oxide and titanium oxide;
disposing a liquid crystal layer between said dielectric mirror layer and said second electrode, for enabling double-refraction of the impinging light; and applying a voltage potential across the first and second electrodes.

20. The method as claimed in claim 19, further comprised of:
said photoconductor layer comprising amorphous silicon and hydrogen;
said light absorbing layer comprising of 10 to 20 laminations of alternate layers of silicon and silicon oxide; and
said dielectric mirror layer comprising of 12 to 24 laminations of alternate layers of silicon oxide and titanium oxide.

21. The method as set forth in claim 19, further comprised of:
said photoconductor layer comprising amorphous silicon and hydrogen;
said light absorbing layer comprising a plurality of laminations of alternate layers of silicon and silicon oxide; and
said dielectric mirror layer comprising a plurality of laminations of alternate layers of silicon oxide and titanium oxide.

22. A method for fabricating a liquid crystal light valve, comprising the steps of:
forming a photoconductor layer on a substrate;
forming a light absorbing layer on the photoconductor layer, said light absorbing comprising layers of silicon and silicon oxide; and
forming a dielectric mirror layer on the light absorbing layer, said dielectric mirror layer comprising layers of silicon oxide and titanium oxide.

23. The method as claimed in claim 22, further comprised of:
said photoconductor layer comprising one of a first combination of amorphous silicon and hydrogen and a second combination of p-type amorphous silicon, boron and hydrogen;
said light absorbing layer comprising of 10 to 20 laminations of alternate layers of silicon and silicon oxide; and said dielectric mirror layer comprising of 12 to 24 laminations of alternate layers of silicon oxide and titanium oxide.

24. The method as set forth in claim 22, further comprised of:

said photoconductor layer comprising one of a first combination of amorphous silicon and hydrogen and a second combination of amorphous silicon, boron and hydrogen;

said light absorbing layer comprising a plurality of laminations of alternate layers of silicon and silicon oxide; and said dielectric mirror layer comprising a plurality of lamination of alternate layers of silicon oxide and titanium oxide.

* * * * *

UNITED STATES PATENT AND TRADEMARK OFFICE
CERTIFICATE OF CORRECTION

PATENT NO. : 5,272,554
DATED : December 21, 1993
INVENTOR(S) : Il-Hwan Ji, et al.

It is certified that error appears in the above-indentified patent and that said Letters Patent is hereby corrected as shown below:

| Column 1, | Line 36, | Change "incium" to --indium--; |
| Column 2, | Line 11, | Add --the-- preceding "reflective"; |
| | Line 50, | Add --,-- preceding "the"; |
| Column 3 | Line 31, | changing "TiO$_2$Si$_2$" to --TiO$_2$/SiO$_2$--. |
| Column 4 | Line 30, | Add --combined-- preceding "and"; |

Signed and Sealed this

Fourth Day of October, 1994

Attest:

BRUCE LEHMAN

Attesting Officer

Commissioner of Patents and Trademarks